(12) United States Patent
Hick et al.

(10) Patent No.: US 12,515,506 B2
(45) Date of Patent: Jan. 6, 2026

(54) WINDOW UNIT COMPRISING A GLAZING PANEL AND A FRAME

(71) Applicant: AGC GLASS EUROPE, Louvain-la-Neuve (BE)

(72) Inventors: Robert Hick, Chenee (BE); Frank Bekaert, Ramillies (BE); Sébastien Delneufcourt, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 425 days.

(21) Appl. No.: 18/005,726

(22) PCT Filed: Jul. 29, 2021

(86) PCT No.: PCT/EP2021/071249
§ 371 (c)(1),
(2) Date: Jan. 17, 2023

(87) PCT Pub. No.: WO2022/029000
PCT Pub. Date: Feb. 10, 2022

(65) Prior Publication Data
US 2023/0356577 A1    Nov. 9, 2023

(30) Foreign Application Priority Data
Aug. 6, 2020    (EP) .................................. 20189781

(51) Int. Cl.
*B60J 10/265*    (2016.01)
*B60J 10/18*    (2016.01)
(Continued)

(52) U.S. Cl.
CPC ............ *B60J 10/265* (2016.02); *B60J 10/18* (2016.02); *B60J 10/70* (2016.02); *B60R 13/04* (2013.01)

(58) Field of Classification Search
CPC ... B60J 10/265; B60J 10/70; B60J 1/10; B60J 10/18; B60R 13/04
(Continued)

(56) References Cited

U.S. PATENT DOCUMENTS 3,783,568 A * 1/1974 Adler ..................... B60J 10/365
29/469
3,815,303 A * 6/1974 Ziegler .................... B60J 10/18
52/204.597
(Continued)

FOREIGN PATENT DOCUMENTS

CN    102996021 B    3/2015
DE    2659262 A1 *    7/1978    ............ B60J 10/265
(Continued)

OTHER PUBLICATIONS

International Search Report Issued Oct. 18, 2021 in PCT/EP2021/071249 filed on Jul. 29, 2021, 3 pages.

*Primary Examiner* — Brent W Herring
(74) *Attorney, Agent, or Firm* — Oblon, McClelland, Maier & Neustadt, L.L.P.

(57) ABSTRACT

A window unit includes a glazing panel and a rigid part provided on at least a part of an edge of the glazing panel on at least one peripheral side and designed to receive a decorative strip. The rigid part includes at least one snap-fit system with a base and at least first and second arms. The window unit also includes a frame profile encompassing the edge of the glazing panel on at least one peripheral side and is made of soft material. The frame profile is over-molded on at least a part of the rigid part. The snap-fit system has at least one rigid arm and at least one flexible arm.

16 Claims, 5 Drawing Sheets

(51) Int. Cl.
  *B60J 10/70* (2016.01)
  *B60R 13/04* (2006.01)
(58) Field of Classification Search
  USPC ............... 52/204.5, 204.597, 716.5; 296/93
  See application file for complete search history.

(56) References Cited

U.S. PATENT DOCUMENTS

| | | | | |
|---|---|---|---|---|
| 4,349,994 | A * | 9/1982 | Maekawa | B60J 10/235 |
| | | | | 52/204.597 |
| 4,853,520 | A * | 8/1989 | Hochart | B60J 10/16 |
| | | | | 219/202 |
| 5,032,444 | A * | 7/1991 | Desir, Sr. | B60J 10/70 |
| | | | | 52/716.5 |
| 5,078,444 | A * | 1/1992 | Shirahata | B29C 48/12 |
| | | | | 52/204.597 |
| 5,355,651 | A * | 10/1994 | Correia | B60J 10/30 |
| | | | | 29/451 |
| 5,358,764 | A * | 10/1994 | Roberts | B60J 10/265 |
| | | | | 428/458 |
| 6,382,696 | B1 * | 5/2002 | Young | B60J 10/18 |
| | | | | 52/204.597 |
| 9,969,250 | B2 * | 5/2018 | Takeda | B60R 13/04 |
| 2003/0075949 | A1 | 4/2003 | Kanie et al. | |
| 2003/0168814 | A1 * | 9/2003 | Struyven | B60J 10/77 |
| | | | | 277/402 |
| 2005/0233110 | A1 * | 10/2005 | Miyakawa | B29C 48/0016 |
| | | | | 428/122 |
| 2016/0101675 | A1 | 4/2016 | Timmermann | |
| 2020/0086727 | A1 * | 3/2020 | Guellec | B60J 10/78 |

FOREIGN PATENT DOCUMENTS

| | | | |
|---|---|---|---|
| DE | 10 255 151 A1 | 6/2004 | |
| EP | 431964 A * | 6/1991 | ............ B60J 1/2002 |
| EP | 1621407 A1 * | 2/2006 | ............ B60R 13/04 |
| WO | WO 2014/206782 A1 | 12/2014 | |

* cited by examiner

WINDOW UNIT COMPRISING A GLAZING PANEL AND A FRAME

TECHNICAL FIELD

The present invention relates to an automotive window unit comprising a glazing panel, a decorative strip and a frame profile on at least one part of a peripheral side of the edge of an automotive window unit. The invention relates also to a method of producing a window unit provided with a decorative strip.

BACKGROUND ART

Window unit with a glazing panel and a frame is known. To manufacture a window unit provided with a frame surrounding a glazing panel, a primer or/and an adhesive is applied in the edge region of the glazing panel on an inner side, a face side and an outer side before a primary part (frame profile) is moulded onto the edge region of the peripheral side of the glazing panel.

Such window units are often equipped with decorative strip in order to enhance the visible aspect of the window. Generally, decorative strips are made of metallic or plastic materials and are fixed to the glazing by different means such as: glue, bending of the decorative strip in specific area (harpoon), metallic fixations integrated to the frame or overmolding of the strip during an encapsulation process.

Today, some window units have a frame that is provided around the glazing unit by encapsulation with a soft material and a decorative strip is fixed to the glazing panel with metallic fixation such as metallic clips as described in DE19818153. These metallic clips are fixed manually on the encapsulated frame before the decorative strip assembly. However, this kind of manufacturing is manpower consuming and increase the cost of the window manufacturing.

Also today, more and more, encapsulation of a frame profile with high thickness of encapsulated material which requests the use of an insert to manage the obtaining of a window unit, with a glazing panel, a frame, and an decorative strip with quality encountering the end user expectation in term of surface aspect are used.

Further to the role of supporting the decorative strip, insert is also used to increase the rigidity of the glazing unit in some specific area like rear corner. The use of such insert allows also a cycle time reduction of the process of manufacturing due to higher cooling speed after injection of the material for encapsulation. Generally, hard thermoplastic materials are used (Young Modulus E>1000 Mpa:PP, PC/ABS, . . . ) as material for the insert.

In the Chinese patent CN102272463A, it is disclosed an insert for fixing a decorative strip on a moulding frame. The insert comprises at least one clamp having at least an upstream mating portion that cooperates with the molding frame and a downstream mating portion that allows mating with the attachment accessory, the upstream mating portion includes a plurality of hook feet connected by a base, the extremity of each foot is deformable. In the step of fixing the decorative strip to a moulding frame, by applying force in two opposite directions at the extremity of the foot toward the material of the forming strip The extremity of the foot deforms to penetrate the material of the shaped strip. However, the insert has multiple hooking feet, and the shape is complicated, making its own manufacturing process complicated, and making its installation process complicated, which increases the manufacturing cost.

SUMMARY OF INVENTION

The technical problem to be solved by the present invention is to provide an window unit with a glazing panel and an insert in view of the shortcomings of the structure of the existing rigid part or more particularly an insert, easy to produce and allowing an easy fixation of decorative strip.

According to a first aspect of the invention, the invention relates to an improved a window unit comprising:
 a glazing panel,
 a rigid part provided on at least a part of the edge of the glazing panel on at least one peripheral side and designed to receive a decorative strip, the rigid part comprising at least one snap-fit system comprising a base and at least a first and a second arms,
 a frame profile encompassing the edge of the glazing panel on at least one peripheral side and being made of soft material, and the frame profile being overmolded on at least a part of the rigid part, According to the present invention, the snap-fit system has at least one rigid arm and at least one flexible arm.

According to one embodiment of the present invention, the rigid part encompasses at least a part of the edge of the glazing panel on at least one peripheral side. In that case, the rigid part forms an insert to fix on it a decorative strip.

The present invention relates to the technical field of installation of decorative strips on glass windows, in particular to inserts used for installing bright decorative strips on the edging of automobile glass, and glass windows including decorative strips, inserts and edging The aim of this invention is to provide a rigid part that can be an insert to be fixed to a glazing panel to form a window unit according to the present invention with integrated fixation means for the decorative strip in the insert.

According to the present invention the insert and the fixations means are provided in an one piece and in the same material. The use of an insert provided with at least one mean of fixation integrated to the insert and made in the same material leads to a cost reduction and part surface aspect quality improvement.

The fixations are integrated to the insert. So no additional fixation mean assembly is requested after manufacturing of the rigid part or more particularly the insert. The fixations mean i.e. snap-fit system can be made with the same material as the rigid part or in a different material. In that case, fixation mean can be produced separately and then overmolded in the insert mould.

The at least on snap-fit system allows an easy assembly of the decorative strip on the glazing panel. The strip could be removable or not removable depending of the design of the snap-fit system. In some cases, the decorative strip could be removable before the assembly of the module on the car. This allows a reworking of the part in case of issue in production without having risk of disassembly of the decorative trim on the car which would be an issue in term of safety and theft risk.

It is understood that more than one snap-fit system can be integrated to well fix the decorative strip to the rigid part. The number and their location will depend on the type as well the shape and the material of decorative strip.

According to one embodiment of the present invention, the rigid arm of snap-fit system provided on the rigid part has an elasticity factor lower than 20 mm, and in that the flexible arm has a elasticity factor higher than 30 mm, the elasticity factor being defined as the square of the average length of the arm divided by the average thickness of the arm.

To allow an assembly between the decorative strip and the rigid part, a displacement (y) of the flexible arm of the snap-fit system is needed. The direction of the displacement is generally perpendicular to the line formed by the feet (basis) of the arm to the top of the arm. The relation between the displacement (y) of the arm and the strain ratio (ε) at the feet of the arm is:

$$y=0.67\varepsilon(\Gamma 2)/e=0.67\varepsilon EF, \text{ with the elasticity factor } EF=(\Gamma 2)/e$$

So for a given admissible strain ratio ($\varepsilon_{max}$) linked to the material used, the maximum displacement ymax of the flexible arm, which allow the flexible arm to work in an elastic behaviour without risk of breakage, is directly proportional the elasticity factor EF. The elasticity factor is independent of the material used but linked to the design of the flexible arm of the snap-fit system.

It means that the more EF is high, the more the flexible arm can move without risk of damage and with a correct spring back effect.

According to the invention, the risk of snap-fit system (clip) breakage is reduced due to the requested deformation linked to the trim assembly. This allows to proceed to a safe, quick and easy assembly of the trim on the module.

Furthermore, this conception allows also the removability of the decorative strip after assembly by use of a flat screw driver for example. This allows a reworking of the part in case of issue in production without having risk of disassembly of the decorative trim on the car which would be an issue in term of safety and theft risk. Nevertheless, the decorative strip cannot be removed after its assembly on the car. In some cases, the decorative trim could be removable before the assembly of the module in on the car.

According to one embodiment of the present invention, the rigid part for fixing a decorative strip is made of hard thermoplastic material with a Young Modulus higher than 1500 Mpa. Hard materials are sometimes use to bring some more stiffness to the part, reduce soft material thickness and/or add function to the encapsulated window unit. In preferred embodiments, the hard material is not visible after assembly of the encapsulated window unit on the car.

According to one embodiment of the present invention, the rigid part for fixing the decorative strip is made of hard thermoplastic material chosen amongst polypropylene (PP), polycarbonate (PC), styrenic materials (ABS), polyamide (PA), polyvinyl chloride (PVC).

According to one embodiment of the present invention, the rigid part is made of hard material comprising fillers (glass fibres, glass beads, calcium carbonate, talc, silica, wollastonite, clay, calcium sulphate fibres, mica).

The presence of fillers may improve the adhesion of the rigid part on at least on part of the glazing panel and reinforce the rigid part.

The hard material, which could be also filled with filler as glass fiber, ball glass, talc, etc. are covered at least partially with the soft material after an overmolding process.

According to one embodiment of the present invention, the window unit is provided with a frame profile which is an injected-moulding frame.

According to one embodiment of the present invention, a primer is provided between the frame profile and the edge of the glazing panel to bond the frame profile with the glazing panel.

According to one embodiment of the present invention, the frame profile encompassing the edge of the glazing panel on at least one peripheral side and is made of soft material which has a young modulus lower than 1000 Mpa. The soft material, which has a young modulus lower than 1000 Mpa can be made of thermoplastic elastomer based material. Styrenic based and vulcanized thermoplastics elastomer are generally used. The soft component is in another embodiment a soft polyvinyl chloride.

The soft material is used to give the final surface aspect of the frame and also to fit the window unit to the car body. Effectively, the softness of the material allow interferences between the carbody and the window unit by the use of soft lips. Soft material is sometimes also used to insure a sealing function between the carbody and the encapsulated window unit.

According to one embodiment of the present invention, the frame profile encompassing the edge of the glazing panel on at least one peripheral side and is made of soft material which has a natural chemical cohesive bonding with the hard material. Thus, a good adhesion between the frame profile and the rigid part may be obtained without using a primer between the two parts.

According to another embodiment of the present invention, a primer is provided between the rigid part and the frame profile to bond the frame profile with the rigid part.

According to one embodiment of the present invention, the snap-fit system of the rigid part to fix the decorative strip has a U-shape or is U-shape like. This design allows to have a good balance between the elasticity and the rigidity of the snap-fit system to fix efficiently the decorative strip through the rigid part.

According to one embodiment of the present invention, a stroke limiter is integrated to the rigid part in order to limit the displacement of the flexible arms of the snap-fit system. The stroke limiter allows to limit the deformation of the second arm of the snap-fit, avoiding any snap-fit (clip) deterioration linked to bad manipulation.

According to one embodiment of the present invention, a guide is integrated to the rigid part in order to better align the rigid part and the decorative trim by fitting of the guide with the decorative trim rigid arms.

The use of a guide allows to insure a correct assembly, guide can in some cases be integrated to the rigid part or more particularly to the insert and the decorative strip too. The function is to guide the decorative strip according to the rigid part (or insert) and so insure an perfect alignment between both parts, which is then a guarantee of a high quality positioning of the decorative strip on the encapsulation of the frame profile.

According to one embodiment of the present invention, the frame profile and the rigid part are injected at least partially on the glazing during an injection moulding process. Thus, the process of manufacturing the window unit according to the present invention is simplified.

According to one embodiment of the present invention, the rigid part is an insert first produced in a separate mould by injection moulding and overmolded with the frame profile made of a soft material in an encapsulation mould or cavity of a mold.

The rigid part or more particularly the insert may be produced and stored before being assembly on at least one part of a edge of a glazing panel and then overmolded with the frame profile made of a soft material in an encapsulation mould.

According to one embodiment of the present invention, the rigid part is directly moulded by encapsulation on at least one peripheral side of the glazing panel and overmolded with the frame profile made of a soft material in an second encapsulation mould or cavity. This classical 2K process makes the process easier and reduces cost.

The present invention relates also to a method for producing a window unit according to the invention wherein the method includes an overmolding step of a rigid part providing on at least a part of the edge of the glazing panel on at least one peripheral side designed to receive a decorative strip, the rigid part comprising at least a first and a second arms to form a snap-fit system.

According to one embodiment of the present invention, the method includes the following steps:
a. Placing a glazing in a first encapsulation mould or cavity,
b. Encapsulating the rigid part on at least one peripheral side of the glazing panel wherein the decorative strip is intended to be placed,
c. Transferring the glazing and the rigid part so formed in a second encapsulation mould or cavity,
d. Overmolding at least a part of the rigid part by injection of the frame profile and overmolding at least one peripheral side of the glazing panel by injection of the frame profile at the same time in a second encapsulation mould or cavity,
e. Taking back the injected module from the second encapsulation mould or cavity,
f. Assembling the decorative strip on the module by clipping of the decorative strip rigid arms on at least one snap-fit system integrated to the rigid part.

The rigid part or more particularly an insert is then directly moulded on the glazing panel. In that case, a specific encapsulation mould is manufactured. The glazing panel is placed in this mould and the glazing panel is encapsulated directly with the hard material i.e. the rigid part. Later on, the module made of glazing panel and hard rigid part (insert) is placed in another mould or a cavity of the mould and then is overmolded with soft material of the frame profile. The process of manufacturing a glazing panel provided with a frame profile and a rigid part (insert) intended to receive a decorative strip is simplified and reduce the manpower.

The rigid part provided with the at least one snap-fit system is directly encapsulated on the glazing panel and then overmolded in a specific mould. In all these embodiments, no manpower is requested to produce the part and there is no way to dissemble the fixation from the insert after manufacturing.

According to one embodiment of the present invention, the method for producing a window unit includes the following steps:
a. Injecting the rigid part in a separated mould provided with at least one snap-fit system,
b. Placing a glazing and the rigid part in an encapsulation mould,
c. Encapsulating the frame profile on at least one peripheral side of the glazing panel and overmolding the frame profile on at least a part of the rigid part wherein the decorative strip is intended to be placed,
d. Taking back the injected module from the encapsulation mould,
e. Assembling the decorative strip on the module by clipping of the decorative strip rigid arms on at least one snap-fit system integrated to the rigid part.

According to the present invention, the glazing panel can be a flat or curved panel to fit with the design of the car. The glazing panel can be processed, i.e. annealed, tempered, . . . to respect with the specifications of security and anti-thief requirements. A heatable system, for example a coating or a network of wires, can be applied on the glazing panel to add a defrosting and/or a demisting function for example.

In some embodiments, the glazing panel is a glass panel. The glass panel comprises at least one glass sheet.

Alternatively, the glazing panel can be a laminated glass panel. The laminated glazing comprises glass sheets maintained by one or more interlayers positioned between glass sheets.

The glass sheet can be a clear glass or a coloured glass, tinted with a specific composition of the glass or by applying a coating or a plastic layer for example. In embodiments where the glazing panel is a laminated glass panel, it could be advantageous to have varying thicknesses of glass sheets to reduce weight and noise. Due to of induced deformations on the glazing panel, thin glass sheets with a thickness less than 1 mm can be used without be bent or deformed. Thus, such thin glass sheet can keep the desired design.

It is noted that the invention relates to all possible combinations of features recited in the claims.

The following description relates to an automotive window unit but it's understood that the invention may be applicable to others fields like transportation vehicle such as trains, bus, boats, . . . or like architectural windows which may provide an encapsulation surrounding the edge of the window on at least one peripheral side.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

The content of the present invention will be further described below with reference to the drawings. The examples provided herein are illustrative of the scope of the invention defined in the claims. They do not, represent limitative embodiments of the invention. It is noted that the invention relates to all possible combinations of features recited in the following embodiments.

Figure 1:
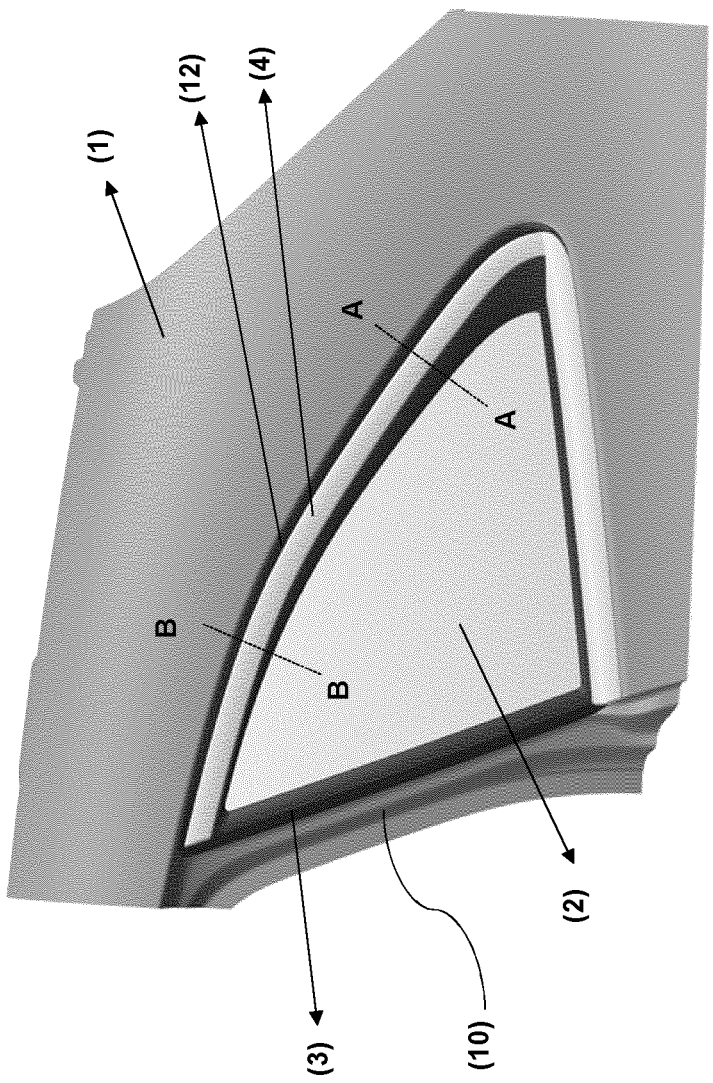
FIG. 1 represents a glazing window unit placed in a carbody according to an exemplifying embodiment of the present invention.
Figure 2:
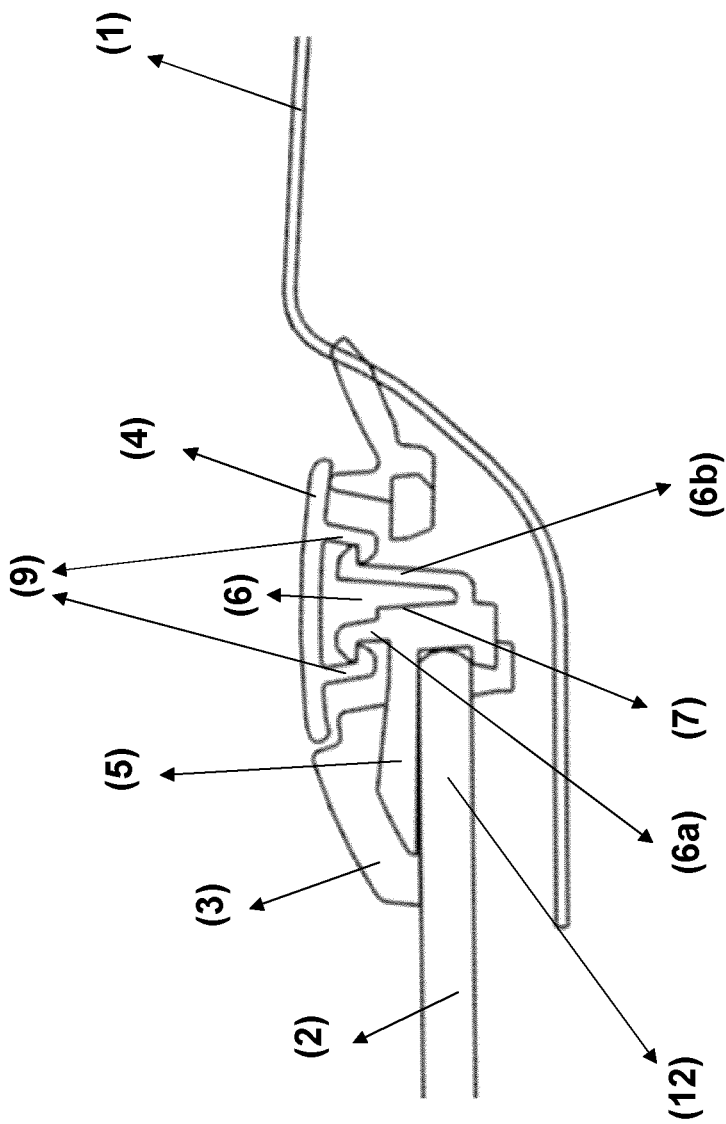
FIGS. 2 and 3 are a cross section of a glazing window unit of FIG. 1 at section A-A.
Figure 3:
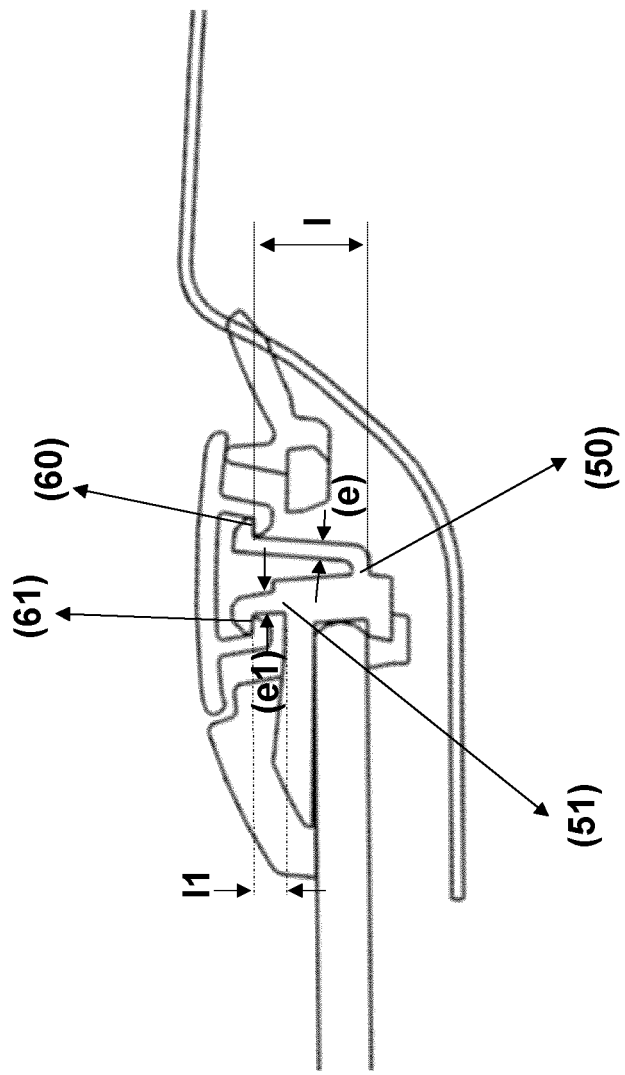

With reference to FIGS. 1-3, a first embodiment of the present invention is described.

FIG. 1 shows a window unit 10 more particularly an automobile window unit installed on a carbody 1. The window unit 10 comprising a glazing panel 2, which has a decorative strip 4 fixed on a rigid part (not visible) provided on at least a part of the edge of the glazing panel 12 on at least one peripheral side. The rigid part is designed to receive the decorative strip 4.

A frame profile 3 is injection-molded along the periphery of the glazing panel 2 on the edge 12 by a technic well known to those skilled in the art according to the design requirements. The frame profile 3 may be provided on the entire periphery of the glazing panel 2 or may be provided on a part of the periphery of the glazing panel. In the present embodiment, the frame which has a frame profile and encompasses the edge of the glazing panel on three peripheral sides.

The window unit 10 has a polygonal shape and particularly a triangular-shape. The glazing panel 2 has slightly the same shape. The frame which has a frame profile and encompasses the edge of the glazing panel on the three peripheral sides.

According to the present embodiment, the rigid part 5 encompasses at least a part of the edge 12 of the glazing panel 2 on at least one peripheral side. In that case, the rigid part forms an insert to fix on it a decorative strip 4.

According to the present invention, the frame profile 3 is made of soft material having a young modulus lower than 1000 Mpa. For example, the soft is selected from thermoplastic material such as: TPE (thermoplastic elastomer), TPV (vulcanized thermoplastic elastomer), TPE-S (styrenic thermoplastic elastomer), soft PVC (soft polyvinyl chloride), or PU (polyurethane) or EPDM (ethylene propylene diene monomer) elastomer but it is not limited to thereto, any other suitable material may be used. According to the present invention, the frame profile 3 is overmoulded on at least a part of the rigid part 5 as shown in FIG. 2. The FIG. 2 represents a cross section of a glazing window unit of FIG. 1 at section A-A.

According to the present embodiment, the rigid part 5 encompasses at least a part of the edge 12 of the glazing panel 2 on at least one peripheral side. In that case, the rigid part forms an insert to fix on it a decorative strip 4.

In order to improve the overall appearance of the car, a decorative strip 4 is provided on the portion of the edge 12 of the automobile glazing panel 2 visible from the outside of the automobile. The decorative strip 4 is used to cover the automotive glazing panel edge 12. In the present description of one embodiment of the present invention, the decorative strip 4 is used as an ornament on the part of the edge of the glazing panel 2 visible from the outside of the automobile. It is understood that the way of fixing the decorative strip 4 to the rigid part 5 may be also suitable for other decorative products or automobile glazing accessories.

In order to well fix/install the decorative strip 4 on the automobile glazing edge 12, the present invention provides a rigid part 5 as shown in FIGS. 2 to 5.

According to the present invention, the rigid part 5 and more particularly an insert comprises at least one snap-fit system 6 comprising a base 50 and at least a first and a second arms 6a;6b, the snap-fit system 6 having at least one rigid arm 6a and at least one flexible arm 6b.

According to the present invention, the snap-fit system 6 is designed to receive and fix the decorative strip 2 by pushing the rigid part and more particularly the insert 5 and the decorative strip 2 interlocking components together. Snap-fits, as integral attachment features, have the advantages of no loose parts.

According to one embodiment of the present invention, the first and the second arms 6a, 6b are provided respectively at their extremity with a curved portion in the form of a hook 60, 61. The second arms 6b can be moved forward the first arm 6a by two external forces in opposite directions so that the two curved portions 60, 61 are inserted into the fitting arms 9 of the decorative trip 4 and snap-fitted to the fitting arms 9 as shown in FIG. 2. The number and the location of snap-fit systems 6 along the rigid part 5 will depend on the shape and the material of the decorative strip.

According to an embodiment of the present invention, the rigid arm 6a has an elasticity factor lower than 20 mm, and in that the flexible arm 6b has a elasticity factor higher than 30 mm, the elasticity factor being defined as the square of the average length l,l1 of the arm 6a,6b divided by the average thickness e,e1 of the arm 6a,6b as shown in FIG. 3. The advantages linked to these features are described above.

The rigid part 5 may be made of hard thermoplastic material with a Young Modulus E higher than 1500 Mpa. The material may be chosen amongst polypropylene (PP), polycarbonate (PC), styrenic materials (ABS), polyamide (PA), polyvinyl chloride (PVC).

The rigid part 5 may comprises fillers (glass fibres, glass beads, calcium carbonate, talc, silica, wollastonite, clay, calcium sulphate fibres, mica) in order to improve his mechanical characteristics for example.

The snap-fit system 6 of the rigid part 5 has preferably a U-shape or is U-shape like. The U-shape or is U-shape like leads to obtain a better fixation.

According to one embodiment of the present invention and as shown in FIG. 2, a stroke limiter 7 may be integrated to the rigid part 5 in order to limit the displacement of the flexible arms 6b of the snap-fit system 6. The stroke limiter 7 prevents an excessive deformation of the flexible arms 6b of the snap-fit system 6 which could lead to a deterioration of the arm 6b.

In the present invention, the snap-fit system 6 with its base 50 and at least its first and second arms 6a, 6b of the insert 5 and the encapsulated frame profile 3 are fixedly connected by integrally injection molding the insert 5 when the encapsulated profile frame 3 is injection moulded on at least a part of the edge of the glazing panel.

Thus, the present invention also provides a method for installing the decorative strip 4 on the edge 12 of a glazing panel 2 through the above-mentioned insert 5.

According to the present invention, the window unit may be produced as claimed above in the description part. The rigid part 5 (or insert) may be directly moulded by encapsulation on at least one peripheral side of the glazing panel 12 and overmolded with the frame profile 3 made of a soft material in an second encapsulation mould The insert 4 is overmolded: produced in a specific injection moulding tool, then placed in the encapsulation mould with the naked glazing panel and then overmolded by the frame profile 3 made of soft material.

In some embodiment, the insert 4 is directly moulded on the glazing panel on the visible edge 12 of the glazing panel. In that case, a specific encapsulation mould is used. The glazing panel 2 is placed in this mould and the glazing panel is encapsulated directly with a hard material. Later on, the module made of glass and hard frame is placed in another mould or cavity and then is overmolded with the frame profile 3 made of soft material.

Hard materials are sometimes use to bring some more stiffness to the part, reduce soft material thickness and/or add function to the encapsulated window unit: guide integrated to rear door fix, fixation use to assemble the window unit to a car body, . . . . Hard material can be polypropylene (PP), polycarbonate (PC) based blend, acrylic based blend, polyamide or other. In preferred embodiments, the hard material is not visible after assembly of the encapsulated window unit on the car. The soft component can be a thermoplastic elastomer based material. Styrenic based and vulcanized thermoplastics elastomer are generally used. The soft component is in another embodiment a soft polyvinyl chloride. The soft material is used to give the final surface aspect of the frame and also to fit the window unit to the car body. Effectively, the softness of the material allow interferences between the carbody and the window unit by the use of soft lips. Soft material is sometimes also used to insure a sealing function between the carbody and the encapsulated window unit.

According to the invention, the fixations means 6 are integrated to the insert 5. So no additional fixation mean assembly is requested after manufacturing of the insert 5. The fixations mean can be made with the same material as the insert or in a different one. In that case, fixation mean can be produced separately and then overmolded in the insert mould.

The fixations mean could be also in another embodiment directly encapsulated on the glass and then overmolded in a specific tool. In all these embodiments, no manpower is needed to produce the part and there is no way to dissemble the fixation from the insert after manufacturing.

Figure 4:
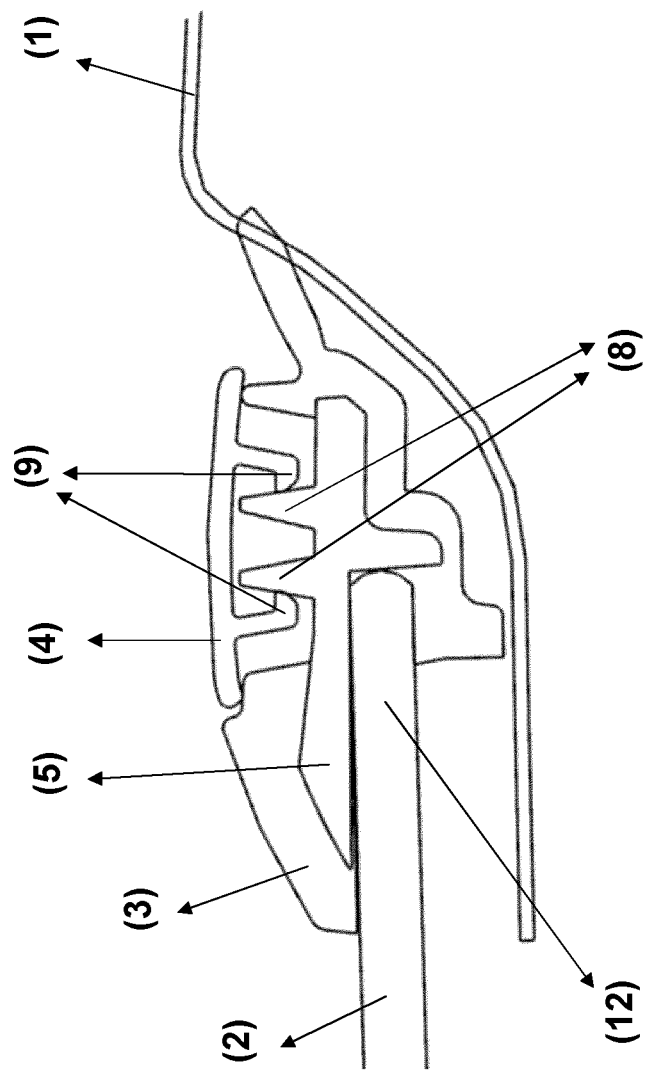
FIG. 4 is a cross section of a glazing window unit of FIG. 1 showing a guide according to one embodiment of the present invention at section B-B.
Figure 5:
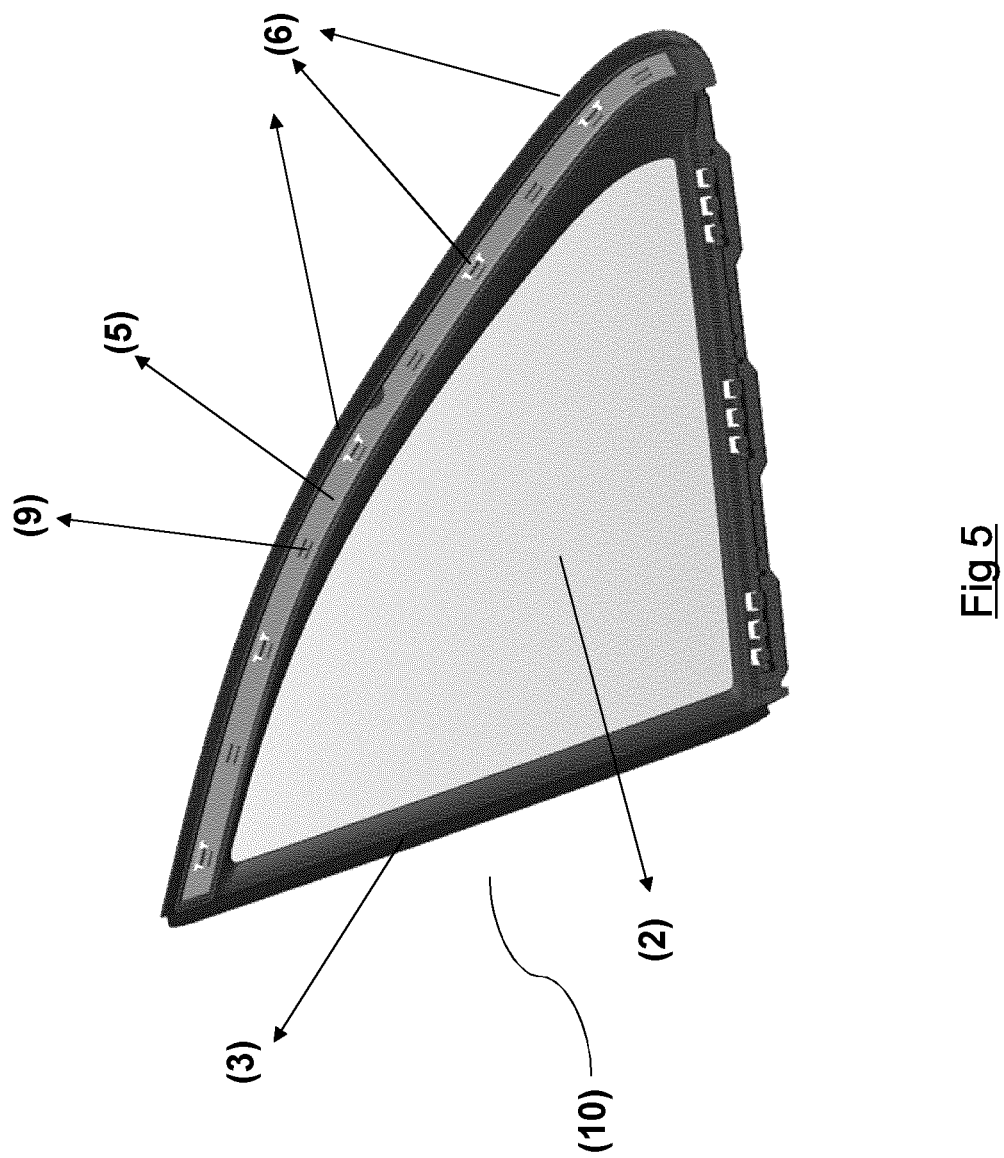
FIG. 5 is the glazing module representing the glazing panel provided with a rigid part and the encapsulated soft frame but without the decorative strip.

As shown in FIG. 4, additionality, a guide 8 may be integrated to the rigid part 5 in order to align the rigid part 5 and the decorative trim 4 by fitting of the guide 8 with the decorative strip rigid arms 9. The guide 8 is preferably made of the same material than the rigid part 5. The guide 8 insures a correct assembly, guide can in some cases be integrated to the insert 5 and the decorative strip 4 too. The function is to guide the decorative strip 2 according to the insert and so insure an perfect alignment between both parts, which is then a guarantee a high quality positioning of the decorative strip 4 on the encapsulation FIG. 5 shows a glazing panel provided with an insert 5. The insert 5 encompasses the edge 12 of the glazing panel 2. The frame profile 3 is overmoulded the insert 5 and is extended along the entire periphery of the glazing panel on at least the side wherein the rigid part is provided. The snap-fit systems 6 according to the invention are distributed along the rigid part. The distance between each snap-fit system 6 is adapted to the decorative strip to be fixed.

Once the decorative strip fixed to the insert, the window unit 10 according to the present invention will be formed.

The invention claimed is:

1. A window unit comprising:
   a glazing panel,
   a rigid part provided on at least a part of an edge of the glazing panel on at least one peripheral side and designed to receive a decorative strip, the rigid part comprising at least one snap-fit system comprising a base and at least a rigid arm and a flexible arm,
   a frame profile encompassing the edge of the glazing panel on at least one peripheral side and being made of soft material, and the frame profile being overmolded on at least a part of the rigid part, and
   wherein the rigid arm has an elasticity factor lower than 20 mm, and wherein the flexible arm has an elasticity factor higher than 30 mm, the elasticity factor being defined as a square of an average length of the arm divided by an average thickness of the arm.

2. The window unit according to claim 1, wherein the rigid part is made of hard thermoplastic material with a Young Modulus higher than 1500 Mpa.

3. The window unit according to claim 2, wherein the rigid part is made of hard thermoplastic material selected from the group consisting of polypropylene (PP), polycarbonate (PC), styrenic materials (ABS), polyamide (PA), and polyvinyl chloride (PVC).

4. The window unit according to claim 2, wherein the rigid part is made of hard material comprising fillers selected from the group consisting of glass fibres, glass beads, calcium carbonate, talc, silica, wollastonite, clay, calcium sulphate fibres, and mica.

5. The window unit according to claim 1, wherein the soft material has a Young Modulus lower than 1000 Mpa.

6. The window unit according to claim 1, wherein the soft material has a natural chemical cohesive bonding with the hard material.

7. The window unit according to claim 1, wherein the snap-fit system of the rigid part has a U-shape or is U-shape like.

8. The window unit according to claim 1, wherein a stroke limiter is integrated to the rigid part in order to limit displacement of the flexible arms of the snap-fit system.

9. The window unit according to claim 1, wherein a guide is integrated to the rigid part in order to align the rigid part and the decorative strip by fitting of the guide with the decorative trim rigid arms.

10. The window module according to claim 1, wherein the frame profile and the rigid part are injected at least partially on the glazing panel during an injection moulding process.

11. The window according to claim 1, wherein the rigid part is directly moulded by encapsulation on at least one peripheral side of the glazing panel and overmolded with the frame profile made of a soft material in a second encapsulation mould.

12. A method for producing a window unit according to claim 1, wherein the method includes overmolding of the rigid part provided on at least a part of the edge of the glazing panel on at least one peripheral side designed to receive the decorative strip, the rigid part comprising at least the first rigid and second flexible arms to form the snap-fit system.

13. The method for producing a window unit according to claim 12, further comprising:
   a. placing the glazing panel in a first encapsulation mould or cavity,
   b. encapsulating the rigid part on at least one peripheral side of the glazing panel wherein the decorative strip is intended to be placed,
   c. transferring the glazing panel and the rigid part so formed in a second encapsulation mould or cavity,
   d. overmoulding at least a part of the rigid part by injection of the frame profile and overmolding at least one peripheral side of the glazing panel by injection of the frame profile at the same time in the second encapsulation mould or cavity,
   e. taking back the injected module from the second encapsulation mould or cavity, and
   f. assembling the decorative strip on the module by clipping of the decorative strip rigid arms on at least one snap-fit system integrated to the rigid part.

14. The method for producing a window unit according to claim 12, further comprising:
   a. injecting the rigid part in a separated mould provided with at least one snap-fit system,
   b. placing the glazing panel and the rigid part in the encapsulation mould,
   c. encapsulating the frame profile on at least one peripheral side of the glazing panel and overmolding the frame profile on at least a part of the rigid part wherein the decorative strip is intended to be placed,
   d. taking back the injected module from the encapsulation mould, and e. assembling the decorative strip on the module by clipping of the decorative strip rigid arms on at least one snap-fit system integrated to the rigid part.

15. A method for producing a window unit, the window unit comprising:
- a glazing panel,
- a rigid part provided on at least a part of an edge of the glazing panel on at least one peripheral side and designed to receive a decorative strip, the rigid part comprising at least one snap-fit system comprising a base and at least a first arm and a second arm,
- a frame profile encompassing the edge of the glazing panel on at least one peripheral side and being made of soft material, and the frame profile being overmolded on at least a part of the rigid part,
- wherein the snap-fit system has at least one rigid arm and at least one flexible arm, and the method comprising:

overmolding of the rigid part provided on at least a part of the edge of the glazing panel on at least one peripheral side designed to receive the decorative strip, the rigid part comprising at least the rigid and flexible arms to form the snap-fit system, and a. placing the glazing panel in a first encapsulation mould or cavity, b. encapsulating the rigid part on at least one peripheral side of the glazing panel wherein the decorative strip is intended to be placed, c. transferring the glazing panel and the rigid part so formed in a second encapsulation mould or cavity, d. overmolding at least a part of the rigid part by injection of the frame profile and overmolding at least one peripheral side of the glazing panel by injection of the frame profile at the same time in the second encapsulation mould or cavity, e. taking back the injected module from the second encapsulation mould or cavity, and f. assembling the decorative strip on the module by clipping of the decorative strip rigid arms on at least one snap-fit system integrated to the rigid part.

16. A method for producing a window unit, the window unit comprising:
- a glazing panel,
- a rigid part provided on at least a part of an edge of the glazing panel on at least one peripheral side and designed to receive a decorative strip, the rigid part comprising at least one snap-fit system comprising a base and at least a first arm and a second arm,
- a frame profile encompassing the edge of the glazing panel on at least one peripheral side and being made of soft material, and the frame profile being overmolded on at least a part of the rigid part,
- wherein the snap-fit system has at least one rigid arm and at least one flexible arm, and the method comprising:

overmolding of the rigid part provided on at least a part of the edge of the glazing panel on at least one peripheral side designed to receive the decorative strip, the rigid part comprising at least the rigid and flexible arms to form the snap-fit system, and a. injecting the rigid part in a separated mould provided with at least one snap-fit system, b. placing the glazing panel and the rigid part in the encapsulation mould, c. encapsulating the frame profile on at least one peripheral side of the glazing panel and overmolding the frame profile on at least a part of the rigid part wherein the decorative strip is intended to be placed, d. taking back the injected module from the encapsulation mould, and e. assembling the decorative strip on the module by clipping of the decorative strip rigid arms on at least one snap-fit system integrated to the rigid part.

\* \* \* \* \*